US009318096B2

(12) United States Patent
Pearlstein

(10) Patent No.: US 9,318,096 B2
(45) Date of Patent: Apr. 19, 2016

(54) METHOD AND SYSTEM FOR ACTIVE NOISE CANCELLATION BASED ON REMOTE NOISE MEASUREMENT AND SUPERSONIC TRANSPORT

(75) Inventor: Larry Pearlstein, Newtown, PA (US)

(73) Assignee: BROADCOM CORPORATION, Irvine, CA (US)

( * ) Notice: Subject to any disclaimer, the term of this patent is extended or adjusted under 35 U.S.C. 154(b) by 443 days.

(21) Appl. No.: 12/942,839

(22) Filed: Nov. 9, 2010

(65) Prior Publication Data

US 2012/0069242 A1 Mar. 22, 2012

Related U.S. Application Data

(60) Provisional application No. 61/385,370, filed on Sep. 22, 2010.

(51) Int. Cl.

*H04B 15/00* (2006.01)
*H04R 5/02* (2006.01)
*H04H 20/48* (2008.01)
*G10K 11/178* (2006.01)

(52) U.S. Cl.

CPC ...... *G10K 11/1788* (2013.01); *G10K 2210/108* (2013.01); *G10K 2210/3023* (2013.01)

(58) Field of Classification Search

CPC .................... G10K 11/1788; G10K 2210/108; G10K 2210/3023
USPC ............. 381/71.1, 94.1, 94.4, 94.7, 317, 73.1
See application file for complete search history.

(56) References Cited

U.S. PATENT DOCUMENTS 7,453,771 B2 * 11/2008 Gatz .................. G10K 11/1788 367/127
8,374,356 B2 * 2/2013 Kino et al. .................. 381/71.2
2005/0111683 A1 * 5/2005 Chabries et al. .............. 381/317
2005/0226434 A1 * 10/2005 Franz ................. G10K 11/1788 381/71.7
2005/0254664 A1 * 11/2005 Kwong et al. ............... 381/71.2
2008/0162072 A1 * 7/2008 Copley ............... G10K 11/1788 702/124

(Continued)

FOREIGN PATENT DOCUMENTS

CN 101656908 A * 2/2010 ............. H04R 29/00

OTHER PUBLICATIONS

Rabinkin et al, "A DSP Implementation of Source Location Using Microphone Arrays", 1996, p. 1-11.*

*Primary Examiner* — Vivian Chin
*Assistant Examiner* — William A Jerez Lora
(74) *Attorney, Agent, or Firm* — Foley & Lardner LLP; Joseph N. Ziebert; Angela D. Murch

(57) ABSTRACT

An audio processing device may estimate noise effects at a particular location based on noise measurement data corresponding to one or more noise sources. The audio processing device may modify one or more output audio content transmitted by the audio processing device to that particular location such that the modification may cancel the estimated noise effects at the particular location, at time when the output audio streams are received at that location. The noise effects estimation may also be based on audio reception measurement data at the particular location. The noise measurement data and/or the audio reception measurement data may be generated by audio capturing devices placed at or near noise sources, and/or at or near the particular location, respectively. The noise measurement data and/or the audio reception measurement data may be communicated to the audio processing device using wired and/or wireless connections.

20 Claims, 5 Drawing Sheets

(56) References Cited

U.S. PATENT DOCUMENTS

2009/0003620 A1* 1/2009 McKillop ............... G06F 3/165
381/80
2009/0136052 A1* 5/2009 Hohlfeld et al. ............. 381/71.1
2010/0028134 A1* 2/2010 Slapak et al. ................. 415/119
2010/0225813 A1* 9/2010 Hirono et al. ................. 348/554
2011/0135125 A1* 6/2011 Zhan ...................... H04R 1/403
381/303

* cited by examiner

METHOD AND SYSTEM FOR ACTIVE NOISE CANCELLATION BASED ON REMOTE NOISE MEASUREMENT AND SUPERSONIC TRANSPORT

CROSS-REFERENCE TO RELATED APPLICATIONS/INCORPORATION BY REFERENCE

This patent application makes reference to, claims priority to and claims benefit from U.S. Provisional Application Ser. No. 61/385,370 filed on Sep. 22, 2010.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for active noise cancellation based on remote noise measurement and supersonic transport.

BACKGROUND OF THE INVENTION

In audio applications, systems that provide audio processing capabilities may be required to support duplex operations, which may comprise the ability to collect audio information through a sensor, microphone, or other type of input device while at the same time being able to drive a speaker, earpiece of other type of output device with processed audio signal. In order to carry out these operations, these systems may utilize audio coding and decoding (CODEC) devices that provide appropriate gain, filtering, and/or analog-to-digital conversion in the uplink direction to circuitry and/or software that provides audio processing and may also provide appropriate gain, filtering, and/or digital-to-analog conversion in the downlink direction to the output devices.

As audio applications expand, such as new voice and/or audio compression techniques and formats, for example, and as they become embedded into more and more devices, novel CODEC standards and/or application may be needed that may provide appropriate processing capabilities to handle the wide range of audio signals and audio signal sources. In this regard, added functionalities and/or capabilities may also be needed to provide users with the flexibilities that new communication and multimedia technologies provide. Moreover, these added functionalities and/or capabilities may need to be implemented in an efficient and flexible manner given the complexity in operational requirements, communication technologies, and the wide range of audio signal sources that may be supported.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for active noise cancellation based on remote noise measurement and supersonic transport, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for active noise cancellation based on remote noise measurement and supersonic transport. In various embodiments of the invention, an audio processing device may receive noise measurement data corresponding to a plurality of noise sources. The audio processing device may estimate based on the received noise measurement data, noise effects caused by the plurality of noise sources at a particular location, such as a location of a user for example. The audio processing device may modify based on the estimation of the noise effects one or more output audio streams transmitted to the particular location. The modification may enable partial or complete cancellation of the estimated noise effects at the particular location, at a time when the output audio streams are received at the particular location. The noise effects estimation may also be performed based on audio reception measurement data corresponding to the location of the user. The noise measurement data and/or the audio reception data may be received via one or more wired and/or wireless links, which are operable to provide supersonic delivery of the data. Exemplary wireless links may comprise wireless personal area network (WPAN) links and/or wireless local area network (WLAN) links. The supersonic delivery of the noise measurement data and/or audio reception measurement data may be sufficiently shorter than the duration of propagation of the noise signals from the noise sources to the particular location as to allow for any additional time required to perform necessary modifications and/or reproductions. In this regard, the additional time may correspond to delays required for capturing and/or generating the noise measurement data and/or audio reception measurement data, for receiving the noise measurement data and/or audio reception measurement data, for performing necessary computations to determine the required modifications based thereon, and/or to perform these modifications in the audio processing device. Accordingly, the audio processing device may track and/or determine information regarding durations and/or delays for generating measurement data, for transmitting the measurement data and/or the output audio streams, and/or for processing the measurement data and/or the audio content to perform the necessary modifications. The noise measurement data and/or audio reception measurement data may be generated by one or more noise sensors. In this regard, the noise sensors are placed at and/or near the plurality of noise sources, and/or the location of the user, respectively. The noise measurement data may also be provided directly by noise sources and/or by other devices coupled to noise sources to provide, for example, audio processing separate and/or independent from the audio processing device. The noise measurement data comprise a sampling of noise signals as captured at noise sources.

Figure 1A:
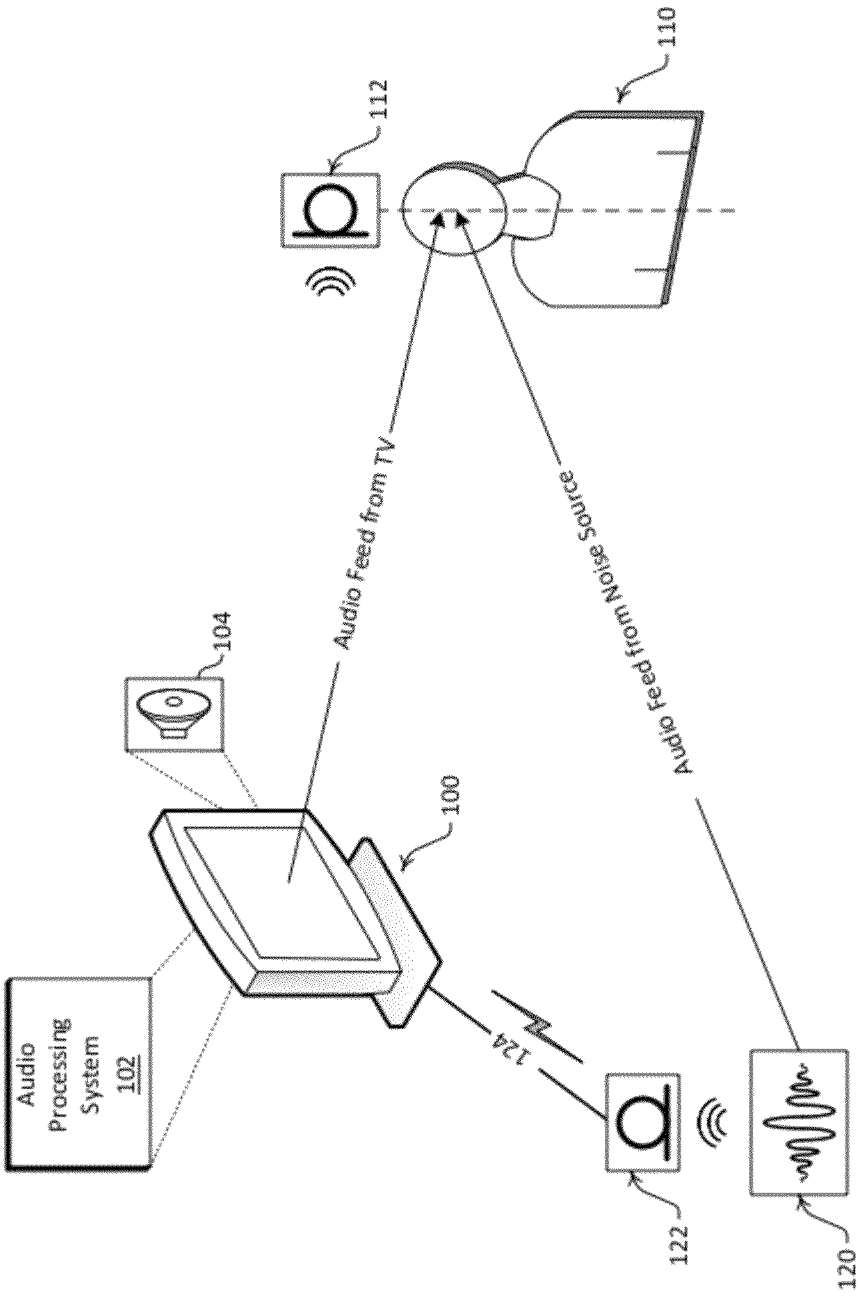
FIG. 1A is a block diagram illustrating an exemplary audio system that may be operable to perform adaptive audio processing to provide audio output feed capable of cancelling noise effects at location of a user, in accordance with an embodiment of the invention.

FIG. 1A is a block diagram illustrating an exemplary audio system that may be operable to perform adaptive audio processing to provide an audio output feed capable of cancelling noise effects at location of a user, in accordance with an embodiment of the invention. Referring to FIG. 1A, there is shown a display device 100, a user 110, a noise source 120, and audio sensors 112 and 122. The display device 100 may comprise an audio processing system 102. Also shown in FIG. 1A is loudspeakers 104.

The display device 100 may comprise suitable logic, circuitry, interfaces and/or code that may be operable to play multimedia streams, which may comprise audio-visual (AV) data. The display device 100 may comprise, for example, a television (such as a HDTV), a monitor, and/or other display playback devices which may be operable to play video streams, and/or corresponding audio data, via the loudspeakers 104 for example. The display device 100 may comprise an audio processing system 102 for handling audio processing operations. In this regard, the audio processing system 102 may comprise suitable logic, circuitry, interfaces and/or code that may be operable to process and/or modify audio content outputted in conjunction with, for example, video content displayed via the display device 100. In an exemplary aspect of the invention, the audio processing system 102 may modify audio content based on, for example, audio measurement data which may be provided by audio sensors, such as the audio sensors 112 and/or 122. In this regard, the audio processing system 102 may support use of wired and/or wireless links, such as a link 124 with the audio sensor 122, to request and/or receive audio measurement data. The audio measurement data may comprise information describing transmitted and/or received audio signals. For example, audio measurement data may comprise amplitude, frequency, and/or power related information. The audio measurement data may also comprise samples and/or copies of transmitted and/or received audio signals.

Each of the audio sensors 112 and 122 may comprise suitable logic, circuitry, interfaces and/or code that may be operable to capture audio signals, and/or to perform various processing and/or audio reception measurement related operations, and to generate based thereon corresponding data. In this regard, the audio sensor 122 may be utilized to capture audio signals corresponding to the noise source 120, and the audio sensor 112 may be utilized to measure audio reception related parameters and/or data at, for example, a location corresponding to the user 110.

The noise source 120 may correspond to one or more sources of noise which may generate undesired audio signals which may interfere with audio content communicated by the display device 102 at a point of reception by user 110. For example, in instances where the user 110 may be utilizing the display device 120 at a residence, the noise source 120 may correspond to internal noise sources, such as audio signals corresponding to operations of other devices (e.g. another TV or a refrigerator), and/or external noise sources, such as noise originating from outside the residence (e.g. street traffic).

The loudspeakers 104 may comprise suitable logic, circuitry, interfaces and/or code that may transduce electrical signals into sound waves.

In operation, the user 110 may utilize the display device 100 for playing audio-visual (AV) content. In this regard, the display device 100 may be operable to display video content, and/or to play corresponding audio content. The user 110 may perceive images corresponding to the video content, and to receive audio content, which may be transmitted as sound waves over the air. In this regard, the audio content may be outputted by loudspeakers 104 for example, which may be integrated directly into the display device 100, and/or maybe be separate and/or dedicated devices that may be coupled to the display device 100. The user 110, however, may not receive the transmitted audio content exactly as intended due to, for example, undesired interference caused by other sources, such as the noise source 120. For example, the user 110 may receive concurrently audio content the outputted by the loudspeakers 104 of the display device 100 and audio signals corresponding to the noise source 120. In this regard, the noise source 120 may correspond to local sources, such as other devices, or external sources, such as street traffic.

Accordingly, in various embodiments of the invention, the audio processing system 102 may be operable to perform adaptive processing of audio content outputted by the loudspeakers 104 of the display device 100. In this regard, adaptive processing may comprise dynamically modifying audio content that may be outputted in conjunction with displayed video content, such that to account for effects of receiving audio signals from noise sources, such as the noise source 120, at a location of the user 110, and at the same time audio content outputted by the loudspeakers 104 of the display device 100 is received. For example, the audio content may be modified such that the combined effect of receiving the modified audio content and audio signals corresponding to noise sources may be equivalent to the audio content as desired, that is, pre-modification. In this regard, modification of the audio content may be such it would cancel the effects of the noise signals at the location of the user 110. In some instances, the desired cumulative effect of receiving both output feeds and noise signals may simply correspond to silence. Accordingly, the audio processing subsystems 102 may be utilized to generate audio feeds which may be outputted via the loudspeakers 104, and which may comprise audio signals that only cancel out predicted noise effects at locations of user 110, at times when noise signals from a noise source, such as the noise source 120 for example, are received therein. Since noise signals generated by the noise source 120 may not be repetitive and/or consistent, modification of the audio content may be continually and/or adaptively adjusted based on characteristics of the noise signals as received at the location of the user 110 at a given times. This may require measuring, sampling, and/or capturing the noise signals at point of origination such as at or near the noise source 120, communicating the data to the audio processing system by means that may be faster than sound wave propagation in air such as by wired and/or wireless communication, and performing predictive computations by the audio processing system 102 to estimate how the noise signals would be received. Furthermore, the predictive computations may also depend on information regarding the distance and/or orientation of user 110 relative to the noise source 120, and/or potential changes caused by the propagation path (e.g. interference, deflection, etc.), which may be derived from reception measurement at or near the user 110.

For example, the audio processing system 102 may receive measurement data from the audio sensor 112, which may comprise audio reception parameters corresponding to various sources, including, for example, audio content outputted by the loudspeakers 104 of the display device 100 and/or to audio signals received from noise sources, such as the noise source 120. The audio sensor 122 may be utilized to capture audio signals corresponding to the noise source 120, and may generate noise measurement data comprising samples and/or copies of the captured noise signals, and/or information corresponding thereto. The generated noise measurement data may then be transmitted to the audio processing system 102 via the link 124. Transporting measurement data from the noise sensor 122 via the link 124, which is an electronic medium, would ensure supersonic delivery of the information. Furthermore, propagation of audio signals (waves) directly over the air from the noise source 120 to the user 110 may take longer time than the time needed to capture and transmit noise measurement data from the audio sensor 122 via the link 124. In an exemplary aspect of the invention, the supersonic delivery of measurement data may be sufficiently fast compared to the duration of propagation of the noise signals from the noise source 120 to location of the user 110 as to allow for accommodation of time required to perform the necessary modifications. In this regard, the additional time may correspond to delays required for capturing and/or generating the measurement data, for receiving and/or processing the measurement data, for performing necessary computations to determine the required modifications, and/or to perform these modifications. Furthermore, the audio processing system 102 may track and/or determine durations of and/or delays resulting from generating measurement data, for transmitting the measurement data and/or the output audio streams, and/or for processing the measurement data and/or the audio content to perform the necessary modifications, to enable determining whether necessary modifications may be performed in timely manner for example. Accordingly, the audio processing system 102 may receive and utilize noise measurement data from the audio sensor 122 (and similarly audio reception measurement data from sensor 112) to modify audio content outputted by the loudspeakers 104 of the display device 100 in a timely fashion such that the modified audio content may arrive at location of user 110 at the same time the noise signals from noise source 120 whose measurement were utilized in modifying the audio content arrive there. In this regard, the audio processing system 102 may utilize the received noise measurement data received from the audio sensor 122 and/or the audio reception measurement data received from the audio sensor 112, for example, to predict the anticipated effects of the noise signals when received by the user 110. The audio processing system 102 may then modify audio content outputted by loudspeaker 104 of the display device 100 to account for the effects of the corresponding noise signal at the point they are received by the user 110.

In an embodiment of the invention, the audio processing system 102 may determine separation between and/or relative spatial orientation of the user 110 and the noise source 120 to determine, for example, noise effects at the location of the user 110 based on audio signals originating from the noise source 120. In this regard, the audio processing system 102 may determine the relative separation and/or orientation data based on absolute location and/or orientation information corresponding to each of the noise source 120 and the user 110. The absolute location and/or orientation data may be provided by the noise source 120 and/or the user 110, or by other devices located nearby that communicate with the audio processing system 102 such as the audio sensors 112 and/or 122. The absolute location and/or orientation data may also be determined directly by the audio processing system 102, based on, for example, data generated by sensory devices, such as optical or infrared scanners, Z-depth sensors, and/or biometric sensors, which may be coupled to and/or integrated into the audio processing system 102 for example. The audio processing system 102 may also derive location and/or orientation data from tracking and/or analyzing characteristics of the communications between the audio processing systems and the audio sensors 112 and/or 122. In this regard, location and/or orientation determination may be made implicitly, in the form of adaptive signal processing, rather than requiring an explicit and/or dedicated location and/or orientation processing.

Figure 1B:
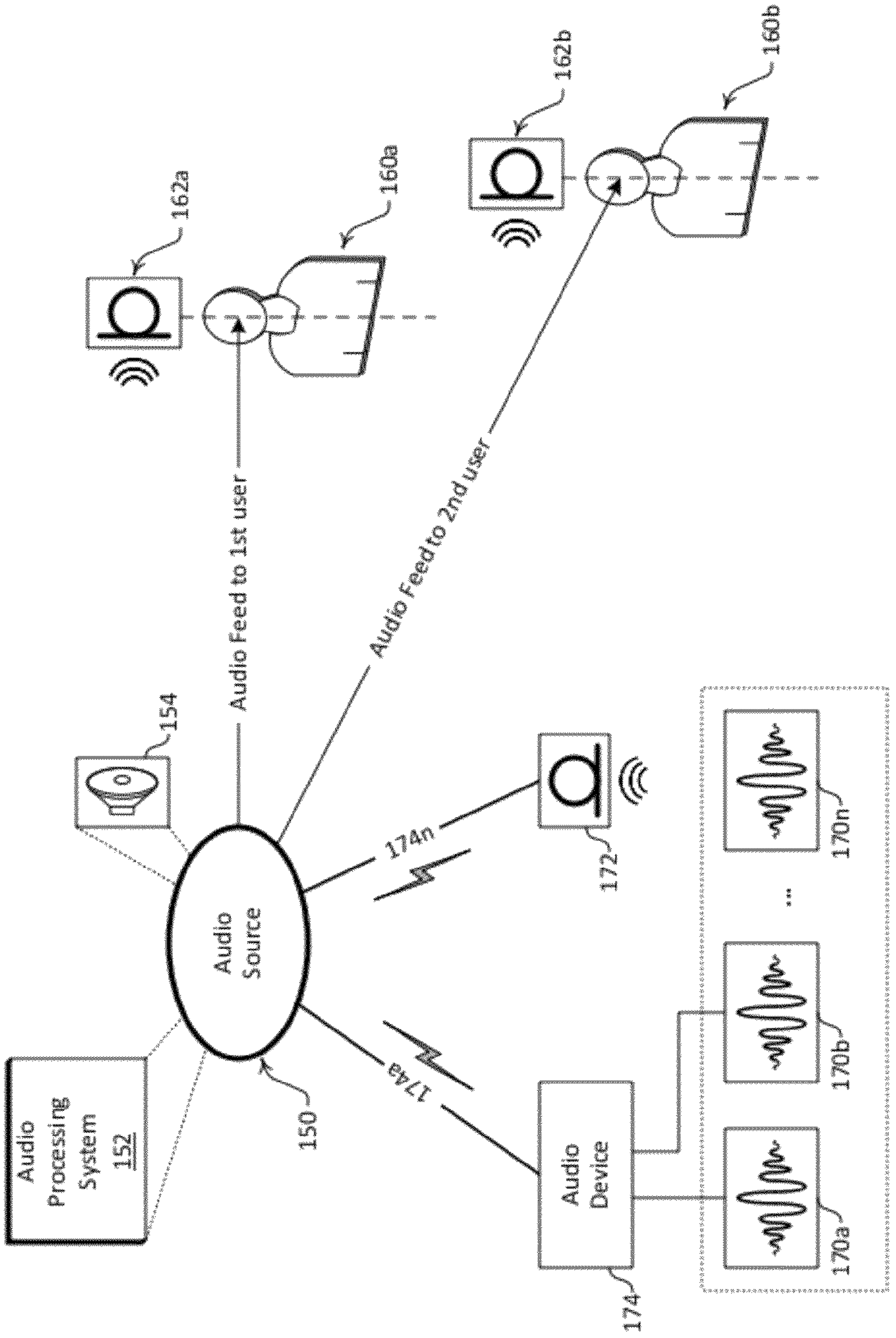
FIG. 1B is a block diagram illustrating an exemplary audio system that may be operable to perform adaptive audio processing to provide multiple individualized audio output feeds capable of cancelling noise effects at corresponding location of users, in accordance with an embodiment of the invention.

FIG. 1B is a block diagram illustrating an exemplary audio system that may be operable to perform adaptive audio processing to provide multiple individualized audio output feeds capable of cancelling noise effects at location of corresponding users, in accordance with an embodiment of the invention. Referring to FIG. 1B, there is shown an audio source 150, users 160*a* and 160*b*, a plurality of noise sources 170*a*, 170*b*, . . . , 170*n*, audio sensors 162*a*, 162*b*, and 172, and an audio device 174. The audio source 150 may comprise an audio processing system 152. Also shown in FIG. 1B is speaker system 154.

The audio sensors 162*a*, 162*b*, and 172 may be similar to the audio sensors 112 and 122, substantially as described with regard to FIG. 1A. In this regard, the audio sensor 172 may be operable to capture audio signals corresponding to a noise source, such as the noise source 170*n*. The audio sensors 162*a* and 162*b* may be operable to measure audio reception related parameters and/or data at, for example, locations corresponding to users 160*a* and 160*b*, respectively.

The audio processing system 152 may be similar to the audio processing system 102, substantially as described with regard to, for example, FIG. 1A. In this regard, the audio processing system 152 may be operable to perform adaptive processing of audio content to enable modification of the audio content. In this regard, the modification may be performed based on, for example, audio measurement data corresponding to noise sources, such as the noises sources 170*a*-170*n*, and/or audio reception measurement data at one or more locations, corresponding to one or more users, such as users 160*a* and 160*b*. In an embodiment of the invention, the audio processing system 152 may be operable to modify the same audio content separately for different users, such as users 160*a* and 160*b*, to account for different noise effects at locations of the users 160*a* and 160*b*. In this regard, a first modified audio content may be generated for user 160*a* to cancel out noise effects at location of user 160*a*, and a second modified audio content may be generated for user 160*b* to cancel out noise effects at location of user 160*b*.

The speaker system 154 may comprise a plurality of speakers, which may be utilized to support various operations performed by the audio processing system 152 for example. In this regard, the speaker system 154 may comprise, for example, one or more loudspeakers utilized to output audio feeds corresponding to the audio source 150, which may correspond to sound reproduction operations performed via the audio processing system 202 for example The speaker system 154 may also comprise one or more cancellation speakers, which may be utilized to create desired audio reception effects at one or more locations, such as locations of users 160*a* and/or 160*b* for example, at any given time.

The audio source 150 may correspond to a source of audio content directed at a plurality of listeners, such as users 160*a* and 160*b*. In this regard, audio content outputted by the audio source 150, using one or more loudspeakers in the speaker system 154 for example, may correspond to a live musical performance for example. For example, the audio source 150 may be utilized to output, using loudspeakers in the speaker system 154, audio content generated from capturing, processing, and/or amplifying audio signals correspond to the actual vocal and/or instrumental performance. The noise sources 170*a*-170*n* may corresponding to sources of noise which may generate undesired audio signals that may interfere with audio content communicated by the audio source 150 at location and/or time of reception of the audio content by users 160*a* and 160*b*. At least some of the noise sources 170*a*-170*n* may correspond to, for example, external noise sources which may be different from and/or unrelated to audio sources whose signals are outputted by the audio source 150. In this regard, the noise source 170*a*-170*n* may correspond to nearby traffic noise for example. At least some of the noise sources 170*a*-170*n*, however, may also correspond to secondary noise effects corresponding to and/or associated with audio sources whose signals are handled and/or outputted by the audio source 150. For example, in instances where the audio source 150, and/or operations thereby, correspond to a live musical performance, the noise sources 170*a*-170*n* may correspond to, for example, performer(s), and/or instruments used thereby, whose audio signals may be captured and processed via the audio processing system 152, which may then generate corresponding reproduction audio feeds that may be outputted, using one or more sound reproduction speakers in this the speaker system 154. In this regard, the noise signals described herein may correspond to the audio signals of the actual performance propagating directly to the users 160*a* and 160*b* rather than through the audio source 150. Accordingly, the noise sources 170*a*-170*n* may comprise purely electronic sources (e.g. CD-players); purely acoustical sources (e.g., drums); and/or combined acoustical-electronic sources (e.g., acoustical guitar that may be coupled with pick up—i.e. microphone—and amplifier). Accordingly, acoustical and/or electronic measurements may be obtained and/or combined to enable configuring, for example one or more speakers, in the speaker system 154, for each user, which may perform cancellation.

The audio device 174 may comprise suitable logic, circuitry, interfaces and/or code that may be operable to capture and/or process audio signals generated by noise sources, such as the noise sources 170*a* and 170*b* for example, separately and/or independently from the audio source 150 and/or the audio processing system 152. For example, the audio device 174 may correspond to a guitar amplifier, which may be utilized in conjunction with electric and/or acoustic guitars for example, receiving sounds generated thereby and generating and/or providing corresponding amplified audio feeds that may be reproduced and/or outputted, via reproduction speakers in the speaker system 154 for example. In an exemplary aspect of the invention, the audio device 174 may be operable to communicate with the audio processing system 152, to enable transmitting data corresponding to the noise sources 170*a* and/or 170*b*. In this regard, the audio device 174 may transmit copies and/or samples of signals corresponding to the noise sources 170*a* and/or 170*b*, as captured by the audio device 174.

In operation, the audio processing system 152 may be used to perform adaptive audio processing on audio content generated and/or outputted by the audio source 150, substantially as described with regard to the audio processing system 102 of FIG. 1A. In this regard, while the audio content outputted by the audio source 150 correspond to and/or comprise audio signals generated directly by the noise sources 170*a*-170*n*, receiving these audio signals and the outputted audio content at the same time may distort the audio content. Furthermore, because the users 160*a* and 160*b* may be at different locations relative to the audio source 150 and/or the noise sources 170*a*-170*n*, characteristics of the audio content received from the audio source 150, characteristics of the noise signals received and 160*b*, and/or effects thereof on audio content at the locations of the users 160*a* and 160*b* may differ. For example, because of different distances and/or paths between noise sources 170*a*-170*n* and users 160*a* and 160*b*, the noise signals may arrive there at with different energy and/or changes during the propagation.

The audio processing system 152 may be utilized in conjunction with the audio source 150 to enable handling audio processing operations in conjunction with the audio content outputted by audio source 150. In this regard, the audio processing system 152 may be operable to perform adaptive audio processing of audio content outputted by the audio source 150. The audio processing system 152 may modify audio content to enable achieving a desired effect at a specific location and/or time. For example, the audio processing system 152 may modify audio content captured and/or generated by the audio source 150, based on, for example, audio measurement data which may be provided by audio sensors, such as the audio sensors 162*a*, 162*b*, and/or 172. The modification may also be performed based on samples and/or copies of audio signals received from other audio sources. For example, the audio processing system 152 may receive from the audio device 174 samples and/or copies of noise signals corresponding to noise sources 170*a* and 170*b*, which may be processed by the audio device 174.

The audio processing system 102 may support use of wired and/or wireless links, such as links 174*a* and 174*n*, to interact with the audio device 174 and/or the audio sensor 172, to request and/or receive audio measurement data and/or signal samples for example. Transporting measurement data electronically from the audio sensors 162*a*, 162*b*, and/or 172, and/or the audio device 174 via wired or wireless links (such as links 174*a* and/or 174*n*) may ensure supersonic delivery of the data. Furthermore, propagation of audio signals (waves) directly over the air from the noise sources 170*a*, 170*b*, . . . , and/or 170*n* to users 160*a* and/or 160*b* may take longer time than the time needed to capture and transmit noise measurement data from the audio sensor 122 via the link 124. Therefore, the audio processing system 152 may be able to receive and utilize noise measurement data (and similarly audio reception measurement data) to modify audio content outputted by the audio source 150 in a timely fashion such that the modified audio content may arrive at locations of users 160*a* and 160*b* at the same time the noise signals whose measurement were utilized in modifying the audio content arrive there, to create desired content reception effects therein, at that specific time (e.g. when noise signals are received. In some instances, the desired effect may simply correspond to silence. Accordingly, audio feeds generated, processed and/or outputted by the audio source 150 may simply be utilized to only cancel out predicted noise effects at locations of users 160*a* and/or 160*b*, at times when noise signals from noise sources, such as the noise sources 170*a*, 170*b*, . . . , and/or 170*n* for example, are received therein. In this regard, the output feeds may comprise inverted samples of the noise signals shifted to account for timing of reception of the corresponding noise signals.

In one embodiment of the invention, the audio processing system 152 may be operable to perform variable modification on the same audio content to enable generating multiple modified audio contents corresponding to multiple different users. For example, noise effects at locations of the users 160*a* and 160*b* may differ, because the users 160*a* and 160*b* may be positioned at different distances and/or orientations relative to the audio source 150, and/or the noise sources 170*a*, 170*b*, . . . , and/or 170*n*. Accordingly, the audio processing system 152 may generate two different modified copies of the same original audio content, one for each of the users 160*a* and 160*b*. In this regard, a first modified audio content may be generated for the user 160*a* to cancel out noise effects at location of the user 160*a*, and a second modified audio content may be generated for the user 160*b* to cancel out noise effects at location of user 160*b*. This may enable the users 160*a* and 160*b* to effectively receive the same original audio content once the noise effects at their respective locations, as predicted, are cancelled.

Figure 2A:
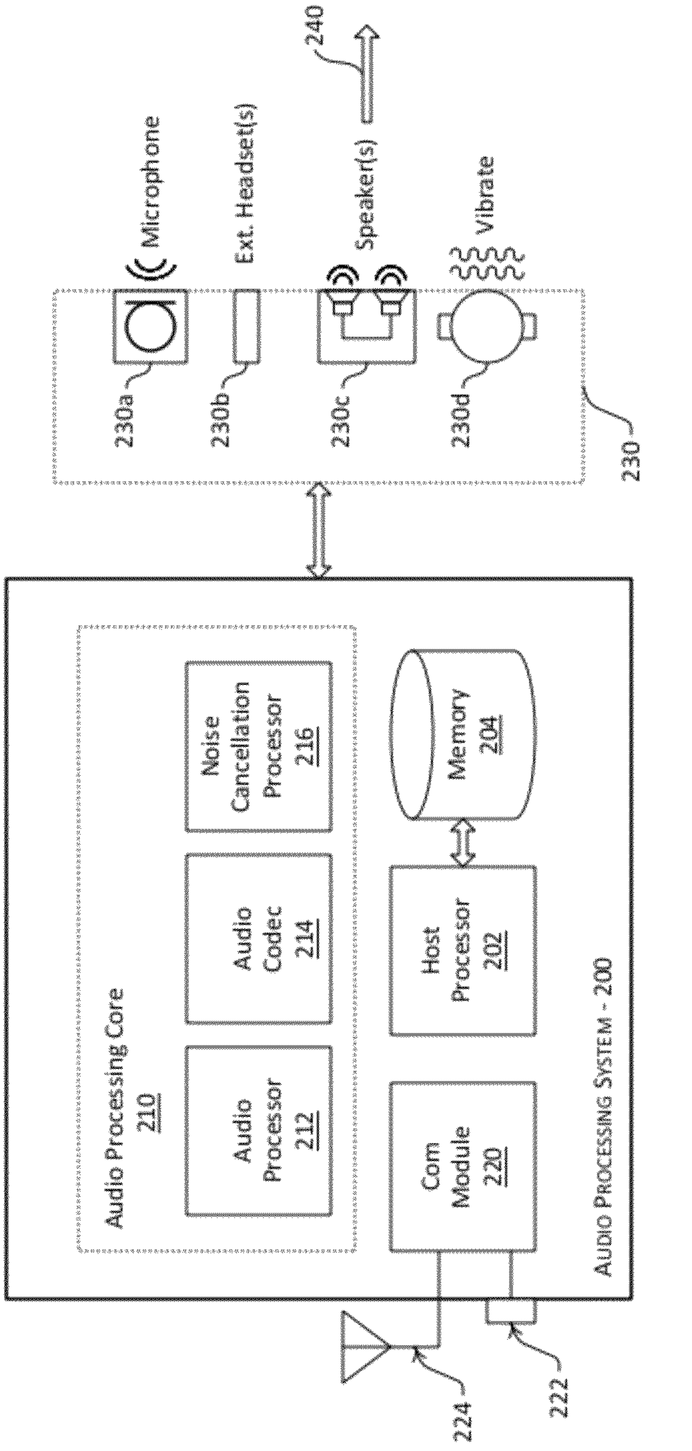
FIG. 2A is a block diagram illustrating an exemplary audio processing system that may support modifying audio output feeds to cancel predicted noise effects, in accordance with an embodiment of the invention.

FIG. 2A is a block diagram illustrating an exemplary audio processing system that may support modifying audio output feeds to cancel predicted noise effects, in accordance with an embodiment of the invention. Referring to FIG. 2A, there is shown an audio processing system 200 and an audio input/out (I/O) system 230.

The audio processing system 200 may comprise suitable logic, circuitry, interfaces and/or code that may enable receiving, generating, and/or processing of audio content. In this regard, the audio processing system 200 may comprise a host processor 202, a system memory 204, an audio processing core 210, a communication module 220, a wired interfacing subsystem 222, and an antenna subsystem 224. In an exemplary aspect of the invention, the audio processing system 200 may be operable to perform adaptive processing of output feeds based on predictive noise computations. In this regard, the predictive noise computations may comprise generating noise cancellation data based on noise effect predictions corresponding to one or more noise sources at a location of a user.

The host processor 202 may comprise suitable logic, circuitry, interfaces and/or code that may be operable to process data, and/or control and/or manage operations of the audio processing system 200, and/or tasks and/or applications performed therein. In this regard, the host processor 202 may be operable to configure and/or control operations of various components and/or subsystems of the audio processing system 200, by utilizing, for example, one or more control signals. The host processor 202 may also control data transfers within the audio processing system 200. The host processor 202 may enable execution of applications, programs and/or code, which may be stored in the system memory 204, for example.

The system memory 204 may comprise suitable logic, circuitry, interfaces and/or code that may enable permanent and/or non-permanent storage, buffering and/or fetching of data, code and/or other information which may be used, consumed and/or processed in the audio processing system 200. In this regard, the system memory 204 may comprise different memory technologies, including, for example, read-only memory (ROM), random access memory (RAM), Flash memory, solid-state drive (SSD) and/or field-programmable gate array (FPGA). The system memory 204 may store, for example, configuration data, which may comprise parameters and/or code, which may comprise software and/or firmware, but the configuration data need not be limited in this regard.

The audio processing core 210 may comprise suitable logic, circuitry, interfaces and/or code that may be operable to perform audio processing operations and/or applications. The audio processing core 210 may be operable to process input and/or output audio content. The audio processing core 210 may comprise, for example, an audio encoder/decoder (CODEC) 210, an audio processor 212, a noise cancellation processor 216.

The audio processor 212 may comprise suitable logic, circuitry, interfaces and/or code that may be operable to perform audio processing operations to audio content handled in the audio processing system 200. In this regard, the audio processor 212 may be operable to perform such operations as sampling and/or analog-to-digital or digital-to-analog conversions. For example, the audio processor 212 may process analog audio signals, captured via the audio system I/O 230 for example, to enable generation of corresponding digital data, and/or processing of digital data to extract and/or generate corresponding audio signals, which may be outputted via the audio system I/O 230. Accordingly, the audio processor 212 may comprise one or more filters, an analog-to-digital converter (ADC) and/or a digital-to-analog converter (DAC). The audio processor 212 may also be operable to up-convert and/or down-convert signal frequencies to desired frequencies for processing and/or for transmission via an output device, such as speakers. For example, the audio processor 212 may comprise adaptive and/or programmable infinite impulse response (IIR) filters and/or adaptive and/or programmable finite impulse response (FIR) filters for at least a portion of the audio sources to compensate for passband amplitude and phase fluctuation for different output devices. Adaptive filters may be operable to self-adjust their filtering functions, by adjusting their filtering coefficients for example, according to optimizing algorithms for example. Exemplary optimizing algorism may comprise, for example, least-mean-square (LMS) based algorithms. In this regard, filter coefficients may be configured or programmed adaptively and/or dynamically based on current operations. Furthermore, filter coefficients may be reprogrammed and/or configured adaptively, in continuous and/or sporadic manner for example. Moreover, filter coefficients may be switched in one-shot or may be switched sequentially, for example. The audio processor 212 may also utilize a modulator, such as a Delta-Sigma ($\Delta$-$\Sigma$) modulator, for example, to code digital output signals for analog processing.

The audio CODEC 214 may comprise suitable logic, circuitry, interfaces and/or code for performing audio encoding and/or decoding. In this regard, the audio CODEC 214 may be operable to perform compression and/or decompression of digital audio data based on one or more compression standards, such as MPEG-1 Audio Layer 3 (MP3), ITU-T G.711/718/729, Windows Media Audio (WMA), Adaptive Multi-Rate (AMR) for example.

The noise cancellation processor 216 may comprise suitable logic, circuitry, interfaces and/or code that may be operable to perform noise cancellation on audio content handled in the audio processing core 210. While the noise cancellation processor 216 is shown as a separate component within the audio processing system 200, the invention need not be so limited. For example, functions or operations described herein with respect to the noise cancellation processor 216 may be performed by other components of the audio processing system 200, such as the host processor 202 and/or the audio processor 212 for example. In an exemplary aspect of the invention, the noise cancellation processor 216 may be operable to perform adaptive processing of output feeds based on predictive noise computations.

The communication module 220 may comprise suitable logic, circuitry, interfaces and/or code that may be operable to provide communication links between the audio processing system 200 and one or more auxiliary devices, which may be communicatively coupled to and/or be operated in conjunction with the audio processing system 200, such as the audio sensors 112, 122, 172, and/or 174. In this regard, the communication module 220 may be operable to process signals transmitted and/or received via, for example, the antenna subsystem 224. The communication module 220 may be operable to, for example, amplify, filter, modulate/demodulate, and/or up-convert/down-convert baseband signals to and/or from RF signals to enable transmitting and/or receiving RF signals corresponding to one or more wireless standards. Exemplary wireless standards may comprise wireless personal area network (WPAN), wireless local area network (WLAN), and/or proprietary based wireless standards. In this regard, the communication module 220 may be utilized to enable communication via Bluetooth, ZigBee, 60 GHz, Ultra-Wideband (UWB) and/or IEEE 802.11 (e.g. WiFi) interfaces.

The wired interfacing subsystem 222 comprises suitable logic, circuitry, interfaces and/or code that may be operable to communicate data and/or messaging via one or more wired interfaces supported by the communication module 220. For example, the wired interfacing subsystem 222 may enable use of one or more Ethernet over twisted pair, coaxial cable, and/or optical fiber based connections during communication to and/or from the audio system 200.

The antenna subsystem 224 comprises suitable logic, circuitry, interfaces and/or code that may operable to perform RF transmission and/or reception via one or more antennas that may be configurable for RF communication based on one or more RF bandwidths, which may correspond to wireless interfaces supported by the communication module 220. For example, the antenna subsystem 224 may enable RF transmission and/or reception via the 2.4 GHz bandwidth which is suitable for Bluetooth and/or WiFi RF transmissions and/or receptions.

The audio I/O system 230 may comprise suitable logic, circuitry, code, and/or interfaces that may enable capture, generation, and/or playback of audio feeds, which may correspond to audio content processed, received, and/or generated via the audio processing system 200 for example. The audio I/O system 230 may comprise, for example, microphones 230*a*, external headsets outlets 230*b*, speakers 230*c*, and/or vibration transducers 230*d*. The microphones 230*a* may comprise suitable circuitry, logic, interface(s), and/or code that may detect sound waves and convert them to electrical signals, which may be analog and/or digital signals, via a piezoelectric effect, for example. In this regard, in instances where the electrical signals generated by the microphone 168 comprise analog signals, analog-to-digital conversion may be required before the captured signals are processed, in the audio processing system 200 for example. In instances where the electrical signals generated by the microphones 230*a* comprise digital signals, no analog to digital conversion may be needed, prior to digital processing in the audio processing system 200 for example. The microphones 230*a* may enable and/or support beamforming capabilities, for example. The external headsets outlets 230*b* may comprise physical connections for external headsets to be communicatively coupled to the audio I/O system 230, to enable outputting sound generated and/or handled via the audio processing system 200 via the headsets. The speakers 230*c* may comprise suitable circuitry, logic, interface(s), and/or code that may be operable to generate audio signals from electrical signals received from the audio processing system 200. Furthermore, the speakers 230*c* may enable and/or support beamforming capabilities, for example. The vibration transducers 230*d* may comprise suitable circuitry, logic, interface(s), and/or code that may generate vibrations, as notification of an incoming call and/or message, or as an alert for example, without the use of sound. The vibration transducers 230*d* may generate vibrations that may be in synch with, for example, audio signals such as speech or music.

In operation, the audio processing system 200 may be utilized to handle audio content captured and/or outputted via the audio I/O system 230. In this regard, the audio processing core 210 may be utilized to perform various operations that may be necessary to ensure that the audio content is captured and/or generated for outputting, properly and/or in accordance with, for example, supported standards and/or available audio output devices. For example, the audio processor 212 may be utilized to process captured analog audio signals to enable preparing them for transformation to digital data, and/or may process digital audio data, extracted after decoding and/or decompression, to facilitate generation of corresponding analog audio signals which may be outputted, for example, via the speakers 230*c* in the audio I/O system 230. The audio CODEC 214 may be utilized to perform audio compression and/or decompression of audio content.

In various embodiments of the invention, the audio processing system 200 may be operable to perform adaptive processing of audio content outputted via the I/O system 230, to enable modification of the audio content that is to be outputted, to achieve a specific effect at a specific location for example. For example, adaptive audio processing may comprise modifying, using the noise cancellation processor 216, audio content that may be outputted in order to account for effects of receiving other audio signals, from noise sources for example, at a location of a user at the time audio content outputted by the audio I/O system 230 is received by the user. In this regard, the audio content may be modified such that the combined effect of receiving the modified audio content outputted via the audio I/O system 230 and audio signals corresponding to noise sources may be equivalent to the audio content as desired, that is, pre-modification. Accordingly, modification of the audio content may be such that it would cancel the effects of the noise signals at a desired location. In an exemplary aspect of the invention, the noise cancellation processor 216 may be operable to perform the required predictive noise cancellation based on audio measurement data corresponding to captured samples of the noise signals, and/or audio measurement data corresponding to the desired location, substantially as described with regard to FIGS. 1A and 1B.

Figure 2B:
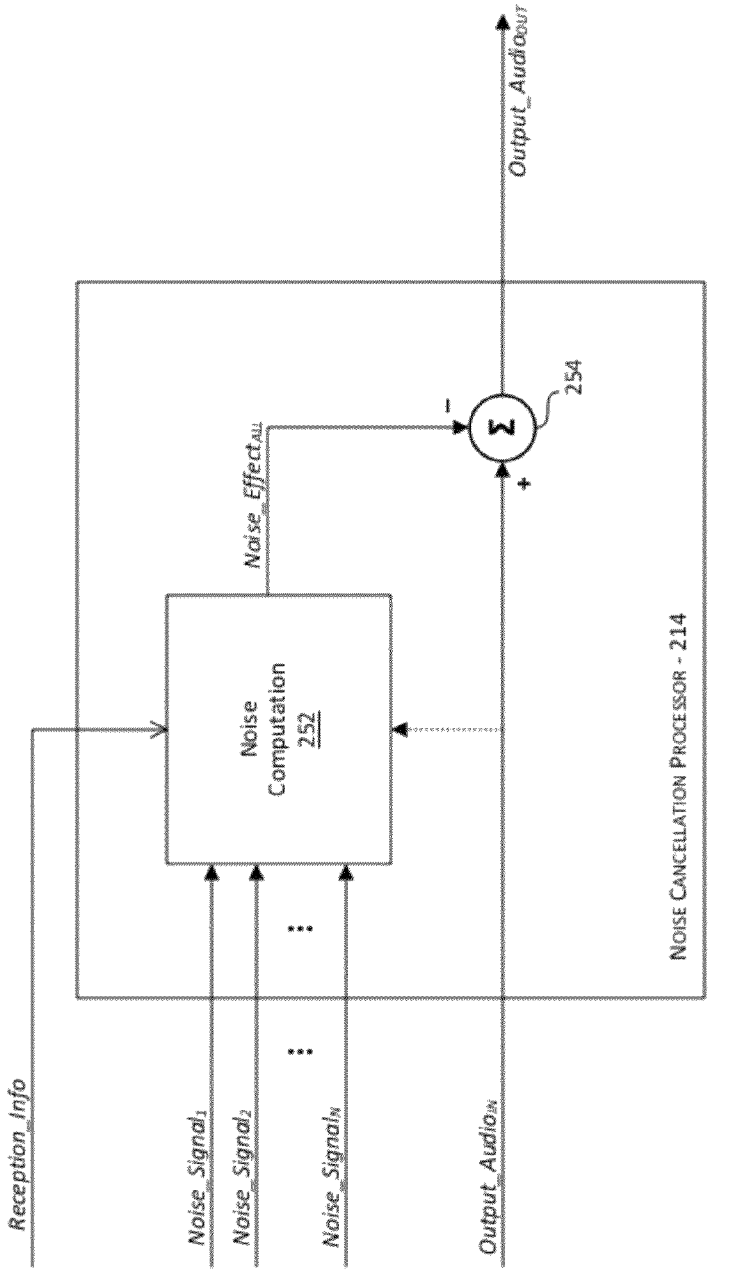
FIG. 2B is a block diagram illustrating an exemplary noise cancellation processor, in accordance with an embodiment of the invention.

FIG. 2B is a block diagram illustrating an exemplary noise cancellation processor, in accordance with an embodiment of the invention. Referring to FIG. 2B, there is shown the noise cancellation processor 214 of FIG. 2B. The noise cancellation processor 214 may comprise a noise computation block 252 and a signal combiner 254.

The noise computation block 252 may comprise suitable logic, circuitry, interfaces and/or code that may be operable to determine a combined noise effect at a location corresponding to a plurality of noise signals, based on audio reception measurement data for that location.

The signal combiner 254 may comprise suitable logic, circuitry, interfaces and/or code that may be operable to combine a plurality of input signals to generate an output signal, wherein said combining may comprise adding, subtracting, and/or necessary scaling adjustments.

In operation, the noise cancellation processor 214 may modify an audio signal $output\_audio_{in}$, which may correspond to the generated audio content as intended to be received by a user, such as user 110, at a specific location. Accordingly, the noise cancellation processor 214 may generate a corresponding audio signal $output\_audio_{out}$, which when received by user 110, the combined effect of currently receiving $output\_audio_{out}$ and other signals from noise sources may effectively be $output\_audio_{in}$.

For example, the noise computation block 252 may receive a plurality of inputs $noise\_signal_1$-$noise\_signal_n$, which may correspond to a plurality of noise sources. The noise computation block 252 may also receive reception_info, which may comprise audio measurement data corresponding to a location, such as the location of user 110, for example. In this regard, the reception_info may be generated by the audio sensor 112. The noise computation block 252 may combine inputs $noise\_signal_1$-$noise\_signal_n$, and may then adjust the corresponding sum, based on reception_info for example, to generate $noise\_effect_{all}$, which may correspond to the combined effect of signals $noise\_signal_1$-$noise\_signal_n$, at the location of user 110 for example.

The computation block 252 may be operable to perform noise computation based calculations in accordance with, for example, adaptive filtering processing, to enable generating predict noise effect signals corresponding the combined effect of receiving the desired signals and noise signals. In this regard, adaptive filtering may comprise utilizing self-adjusting filtering operations, according to optimizing algorithms for example. Exemplary optimizing algorism may comprise, for example, least-mean-square (LMS) based algorithms. For example, the computation block 252 may utilizing adaptive filtering adjustment function:

$$w(t+1)=w(t)-\mu.e(t).x(t)$$

where w(t) is filter coefficients vector function, μ is step-size of adaptive filter utilized therein, x(t) is an input noise signal, and e(t) may correspond to captured signal (e.g. acoustic pick-up signal).

The $noise\_effect_{all}$ may be subtracted from the $output\_audio_{in}$ to generate $output\_audio_{out}$. The $output\_audio_{out}$ may then be transmitted, via speakers 230*c* for example, and when received by user 110, the combined effect of currently receiving $output\_audio_{out}$ and signals $noise\_signal_1$-$noise\_signal_n$ may effectively result in $output\_audio_{in}$.

Figure 3:
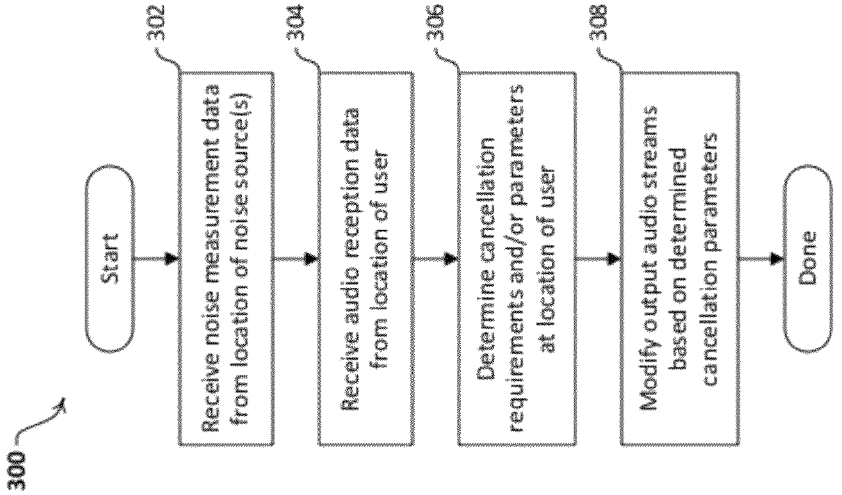
FIG. 3 is a flow chart that illustrates exemplary steps for modifying audio output feeds to cancel predicted noise effects at a location of a user, in accordance with an embodiment of the invention.

FIG. 3 is a flow chart that illustrates exemplary steps for modifying audio output feeds to cancel predicted noise effects at a location of a user, in accordance with an embodiment of the invention. Referring to FIG. 3, there is shown a flow chart 300 comprising a plurality of exemplary steps that may be performed to enable performing active noise cancellation based on remote noise measurement and supersonic transport during audio processing.

In step 302, noise measurement data may be received from location of noise source(s). In this regard, the noise measurement data may comprise captured samples of the noise signals, using audio capturing devices, and/or digital sampled received from audio processing systems that are otherwise used for processing the noise signals. In step 304, audio reception data may be received from location of user. In this regard, the audio reception data may describe the characteristics of audio reception at the location of the user, and may be utilized to account for changes to the audio content and/or noise signals during their propagation to the location of the user. In step 306, a determination of cancellation requirements and/or parameters at the location of user may be performed. This may be done based on the noise measurement data and/or audio reception data. The cancellation related computations may be performed using, for example, least-mean-squares (LMS) algorithm based processing. In this regard, adaptive filtering may be utilized when processing noise source signals captured at and/or near noise sources, with LMS algorithms being utilized to adaptively set filtering coefficients to generate parameters for modifying output feeds in a manner that enable produced a desired cancellation effect at location of one or more users. In step 308, output audio streams may be modified based on determined cancellation parameters. This may enable generation of modified audio content that when received at the location of the user, the combined effect of the receiving the modified audio content and the noise signal would ultimately be the audio content as intended to be delivered to the user.

Various embodiments of the invention may comprise a method and system for active noise cancellation based on remote noise measurement and supersonic transport. The audio processing system 200 may be operable to receive, via the communication module 220, noise measurement data corresponding to a plurality of noise sources, such as the noise sources 102 and/or 170*a*-170*n*. The audio processing system 200 may estimate based on the received noise measurement data, using the noise computation block 252 for example, noise effects caused by the plurality of noise sources at one or more particular locations, such as locations of users 110, 160*a*, or 160*b*, based on the received noise measurement data. The audio processing system 200 may modify based on the estimation of the noise effects one or more audio streams outputted, via speakers 230*c* for example, to the user at that desired location, wherein the modification may enable cancelling the estimated noise effects at the location of the user, at time when the transmitted output audio streams are received by the user. The noise effects estimation may also be based on audio reception measurement data, generated by audio sensors 112, 162*a*, 162*b*, corresponding to the location of the user. The noise measurement data and/or the audio reception data may be received via one or more wired and/or wireless links, using the communication module 220, and the wired interfacing subsystem 222 and/or the antenna subsystem 224. Use of wired and/or wireless links may ensure supersonic delivery of the measurement data. This may allow sufficient time to account for additional delays caused by necessary operations, such as processing and/or capturing operations, such that the audio streams may be modified in timely matter to enable providing the modified output streams when the noise signals are received at the particular location. Exemplary wireless links may comprise wireless personal area network (WPAN) based links and/or wireless local area network (WLAN) based links. The noise measurement data and/or audio reception measurement data may be generated by noise sensors 112, 122, 162*a*, 162*b*, and/or 172. In this regard, the noise sensors 112, 122, 162*a*, 162*b*, and/or 172 may be placed at and/or near the noise sources 120 and/or 170*n*, and/or the location of user 110, 160*a*, and/or 160*b*, respectively. The noise measurement data may also be provided directly by noise sources and/or by other devices coupled to noise sources, such as the audio device 174, to provide, for example, audio processing separate and/or independent from the audio processing system 200. The noise measurement data comprise a sampling of noise signals as captured at noise sources.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for active noise cancellation based on remote noise measurement and supersonic transport.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:

in an audio processing device:

receiving noise measurement data corresponding to one or more noise sources;

receiving location or orientation information related to the noise source(s) and to a particular location;

determining spatial orientation data associated with the particular location relative to said one or more noise sources using the location or orientation information received;

estimating, based on said noise measurement data and said spatial orientation data, an effect of noise caused by said one or more noise sources at said particular location; and modifying one or more output audio streams based on said effect of noise, to cancel said effect of noise caused by said one or more noise sources at said particular location;

wherein the noise source is located remotely from the particular location and the audio device.

2. The method according to claim 1, comprising receiving said noise measurement data via at least one wireless personal area network (WPAN) or wireless local area network (WLAN) interface.

3. The method according to claim 1, wherein said noise measurement data comprises samples of noise signals captured at said one or more noise sources.

4. The method according to claim 1, comprising:

receiving audio reception measurement data corresponding to said particular location, wherein estimating said effect comprises estimating said effect of noise caused by said one or more noise sources based further on said reception measurement data.

5. The method according to claim 4, wherein said audio reception measurement data is provided by one or more noise sensors placed at said particular location.

6. The method according to claim 1, wherein said audio processing device is integrated into a television.

7. A system comprising:

a communication module; and an audio processing device comprising at least one processor configured to:

receive via the communication module noise measurement data from an audio sensor, the noise measurement data corresponding to one or more noise sources;

receive location or orientation information related to said one or more noise sources and to a particular location;

determine spatial orientation data associated with the particular location relative to said one or more noise sources using the location or orientation information;

estimate, based on said noise measurement data and said spatial orientation data, an effect of noise caused by said one or more noise sources at said particular location; and modify one or more output audio streams based on said effect of noise, to cancel said effect of noise caused by said one or more noise sources at said particular location;

wherein said one or more noise sources are located remotely from the particular location and the audio device.

8. The system according to claim 7, wherein the communication module is operable to receive said noise measurement data via at least one wireless personal area network (WPAN) or wireless local area network (WLAN) interface.

9. The system according to claim 7, wherein said noise measurement data comprises a sampling of noise signals as captured at said one or more noise sources.

10. The system according to claim 7, wherein the audio processing device is configured to:

receive audio reception measurement data corresponding to said particular location; and estimate said effect of noise caused by said one or more noise sources based further on said reception measurement data.

11. The system according to claim 10, wherein said audio reception measurement data is provided by one or more noise sensors placed at said particular location.

12. The system according to claim 7, wherein said audio processing device is integrated into a television.

13. A method comprising:

receiving noise measurement data corresponding to a noise source;

receiving location or spatial orientation information related to the noise source and a particular location;

determining spatial orientation data associated with the particular location relative to said noise source using the location or spatial orientation information;

estimating, by a processor, an effect of noise caused by said noise source at said particular location based on said spatial orientation data; and modifying an output audio stream to cancel said effect of noise at said particular location;

wherein the noise source is located remotely from the particular location and the audio device.

14. The method of claim 13, wherein:

receiving noise measurement data comprises receiving noise measurement data for each of a plurality of noise sources; and modifying said output audio stream comprises modifying said output audio stream according to an adjustment of a combination of said noise measurement data for each of said plurality of noise sources.

15. The method of claim 13, comprising:

estimating, by said processor, an effect of noise at a second particular location caused by said noise source; and modifying said output audio stream to cancel said effect of noise at said second particular location.

16. The method according to claim 13, comprising receiving said noise measurement data via at least one wireless personal area network (WPAN) or wireless local area network (WLAN) interface.

17. The method according to claim 13, comprising tracking one or more delays associated with at least one of receiving said noise measurement data, estimating said effect of noise, or modifying said output audio stream.

18. The method according to claim 17, comprising determining, based on said tracking, whether said output audio stream may be modified within a time for a modified output stream to arrive at said particular location and cancel said effect of noise.

19. The method according to claim 13, comprising determining a relative separation between said noise source and said particular location using a sensor.

20. The method according to claim 19, wherein estimating said effect of noise comprises estimating said effect of noise caused by said noise source based further on said relative separation.

* * * * *